United States Patent Office 2,990,391
Patented June 27, 1961

2,990,391
VINYLIDENE CHLORIDE-ACRYLONITRILE COPOLYMER IN SOLUTION OF A MIXTURE OF TETRAHYDROFURAN AND TOLUENE AND METHOD OF PREPARING AN ARTICLE THEREFROM
William G. Grantham, Wilmington, Del., assignor to American Viscose Corporation, Philadelphia, Pa., a corporation of Delaware
No Drawing. Filed July 22, 1958, Ser. No. 750,096
5 Claims. (Cl. 260—30.4)

The present invention relates to liquid compositions of matter, more particularly solutions comprising copolymers of vinylidene chloride and acrylonitrile which can be cast to form films and coatings. The present invention relates more specifically to coatings or films comprising vinylidene chloride-acrylonitrile copolymers containing at least 85% vinylidene chloride, and preferably at least 90% vinylidene chloride.

The coating from solutions of flexible, transparent, regenerated cellulose film, ethyl cellulose film, polyvinyl alcohol film and the like with suitable coating compositions for the purpose of rendering the film moisture-resistant, heat-sealable and otherwise improving the properties thereof is well known. Because they are tough, flexible, strong, transparent, heat-sealable and moisture-resistant, coatings of vinylidene chloride-acrylonitrile copolymers are particularly well adapted for this purpose.

However, maximum moisture-proofness is achieved only with those copolymers containing vinylidene chloride in a high concentration, i.e. in excess of 85% by weight. Unfortunately, however, copolymers containing more than 80% by weight of vinylidene chloride are insoluble, or at least difficultly soluble, in most organic solvents. For example, a vinylidene chloride-acrylonitrile copolymer containing 90% by weight of vinylidene chloride and 10% by weight of acrylonitrile is soluble in methyl ethyl ketone only when the methyl ethyl ketone solvent is heated to about 75° to 80° C. Moreover, even when the properties of such copolymers are improved by heating to form solutions, for example to about 75° C., and even when the casting of the coatings is carried out at this temperature, satisfactory results are not obtained. The solution temperature of such a copolymer (75°–80° C.) being relatively close to the boiling point of the solvent, large quantities of the solvent are lost in the procedure. Moreover, when working in the vicinity of the boiling point of the solvent, bubbles are readily formed in the coating. Furthermore, the base film (e.g. cellophane) is frequently embrittled by the use of temperatures in this range so that optimum coating properties are not obtained, e.g. the coated film lacks sufficient strength to be stretched; imperfect adhesion of the copolymer to the film results, etc. Still further it is very difficult to achieve continuous efficient doctoring when one utilizes the teaching of the prior art.

For these reasons and others, it has not been feasible heretofore to take full advantage of the superior properties of such copolymers in the coating of regenerated cellulose films and the like.

A primary object of the present invention is therefore the provision of solutions which are free of the prior art defects. A further object of the present invention is the preparation of films, particularly those derived from regenerated cellulose, coated with a copolymer of vinylidene chloride-acrylonitrile containing about 85% to about 95% by weight of vinylidene chloride and about 5% to about 15% by weight of acrylonitrile, of improved physical properties and manifestly superior film properties. A further object is the provision of a solvent system for the above-described copolymers, more particularly a solvent system comprising tetrahydrofuran and toluene.

These objects, and others apparent from the disclosure which follows, are achieved in an expedient manner according to the present invention, with the production of good film-forming solutions of vinylidene chloride-acrylonitrile copolymers from which coated films of superior quality can be produced, by using certain tetrahydrofuran-toluene mixtures as solvents.

The improved results thereby achieved by this invention are surprising when it is considered that neither tetrahydrofuran nor toluene by itself gives a solution of a copolymer of vinylidene chloride and acrylonitrile containing at least about 85% by weight of vinylidine chloride, and no more than about 15% by weight of acrylonitrile which can be satisfactorily cast as a film or coating, e.g. vinylidene copolymers of this type are insoluble in boiling toluene. The mechanism by which the unique solvent system of this invention effects the preparation of superior solutions, and films and coatings therefrom, is not fully understood. Although it alone will not dissolve vinylidene chloride-acrylonitrile copolymers containing at least 85% of the former even when boiled, toluene in conjunction with tetrahydrofuran in the relative quantities described herein produces very satisfactory solutions, films and coatings.

The improved results obtained through this novel solvent system become perceptible on the addition of toluene in a quantity of about 20% by weight relative to the total weight of the solvent system. The effect of the added toluene in improving the solutions and the films and coatings cast therefrom increases to the point wherein about 40% by weight of toluene is utilized. However, it is feasible to utilize a 50–50 mixture by weight of tetrahydrofuran and toluene. The improved results begin to diminish when the toluene becomes the predominant component of the solvent system. The preferred concentration of the toluene is in the neighborhood of about 30 to 40% by weight of the solvent mixture.

The solvent system of the present invention is particularly advantageous in that it tolerates substantial quantities of water. It thus does not impair the plasticity of coatings or films formed therefrom. Moreover an extremely important attribute of the solvent system of this invention resides in its ability to effectively dissolve waxes and wax-like substances utilized in preparing moisture proof coatings which appear herein as preferred embodiment. Illustrative of such waxes are carnauba, spermaceti, candelilla, palm and other natural ester waxes, hydrogenated castor oil, benzyl stearate, pentaerythritol di- and tetra-stearates, stearyl stearate, and other synthetic ester waxes, mineral waxes such as paraffin, mixtures of vegetable waxes ("Dee Tee Wax #27"—the vegetable wax used in the table below) and mixtures of any of the above. The amount of wax (or mixtures of waxes) varies over a wide range, depending in a large measure upon the identity of the wax (or waxes) utilized, the degree of slipperiness desired, the degree of moisture-proofing desired, the thickness of the film or coating, the degree of clarity desired, etc. Practical limitations are between about 0.1 and 5.0% by weight of a wax (or mixture of waxes) based upon the weight of solids.

Satisfactory coating compositions for cellophane have been prepared at temperatures ranging between 10 to 50° C. In any event the temperature utilized should be below the boiling point of the tetrahydrofuran component. At these temperatures, lacquers containing from about 5 to about 40% solids can be applied to cellophane resulting in the deposition of from about 2.5 to about 6 grams of coating per square meter of cellophane. In a preferred embodiment, the temperature should be between about 30 and 45° C. and the solids content between about 15 and 30%. In order to obtain optimum moisture proofness, it is generally necessary to deposit between about 4 and 4.5 grams of a coating containing about 90% vinylidene chloride and about 10% acrylonitrile in the form of a copolymer on one square meter of cellophane. In order to produce this optimum coating, it is generally necessary to work at a temperature of about 35° C. and a solids content between about 17 and 23%.

The table which follows is set forth for purposes of illustrating representative compositions of this invention which are satisfactory for coating cellophane. The compositions were applied to cellophane, and upon evaporation of the solvent, formed an adherent, moisture resistant film on cellophane which was clear and transparent.

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Lacquer Formula in Parts by Weight: | | | | | | | | | | | |
| Saran F-242 [1] | 100.0 | 100.0 | 100.0 | 100.0 | 100.0 | 100.0 | 100.0 | 100.0 | 100.0 | 5.0 | 5.0 |
| Colloidal Silica | 0.2 | 0.2 | 0.2 | 0.2 | 0.2 | 0.2 | 0.2 | 0.2 | 0.2 | -------- | -------- |
| Clay | 0.2 | 1.0 | 1.0 | 1.0 | 1.0 | 1.0 | 1.0 | 1.0 | 1.0 | -------- | 0.3 |
| Santicizer 141 [2] | 1.1 | -------- | -------- | -------- | -------- | -------- | -------- | -------- | -------- | -------- | -------- |
| Stearone | 0.9 | 1.1 | 1.1 | 0.9 | 0.9 | 0.9 | 0.9 | 0.9 | 1.1 | -------- | -------- |
| Paraffin | 1.0 | 1.1 | 1.1 | 1.1 | 1.1 | 1.1 | 1.1 | 1.1 | 1.2 | -------- | 0.5 |
| Hydrogenated Castor Oil | 1.2 | 0.5 | 0.5 | 0.3 | 0.3 | 0.3 | 0.3 | 0.3 | 0.6 | -------- | -------- |
| Beckacite 1118 [3] | 1.5 | -------- | -------- | -------- | -------- | -------- | -------- | -------- | -------- | -------- | -------- |
| Silicone | 0.5 | -------- | -------- | -------- | -------- | -------- | -------- | -------- | -------- | -------- | -------- |
| Vegetable Wax | -------- | 0.2 | 0.2 | -------- | -------- | -------- | -------- | -------- | 0.3 | -------- | -------- |
| Acetyl Tributyl Citrate | -------- | 1.2 | 1.2 | 1.2 | 1.2 | 1.2 | 1.2 | 1.2 | 1.6 | -------- | -------- |
| Congo Copal | -------- | -------- | -------- | -------- | -------- | -------- | -------- | -------- | -------- | -------- | 0.3 |
| Lacquer Temperature Beginning-End, °C | 32-32 | 33-33 | 34-34 | 32-32 | 32½ | 32½ | 32½ | 33-33 | 34-34 | 55-60 | 55-60 |
| Lacquer Viscosity at 30° C. in Seconds | 20-20 | 20-20 | 21-21 | 22-22 | 19½-19½ | 20½-20½ | 21½-21½ | 20-20 | 20½-20½ | -------- | -------- |
| Percent Solids | 18.7 | 18.7 | 18.7 | -------- | 18.7 | 18.7 | 18.7 | 18.7 | 18.7 | 5.3 | 5.0 |
| Solvents, Percent by Weight: | | | | | | | | | | | |
| Tetrahydrofuran | 70 | 75 | 80 | 65 | 60 | 55 | 50 | 65 | 65 | 83 | 84 |
| Toluene | 30 | 25 | 20 | 35 | 40 | 45 | 50 | 35 | 35 | 17 | 16 |

[1] Copolymer containing about 90% by weight of vinylidene chloride and about 10% by weight of acrylonitrile.
[2] Alkyl aryl phosphate.
[3] Maleic anhydride modified rosin.

The utility of the coating compositions is not restricted to the coating of cellophane. The coating compositions may be employed in the coating of other materials, for example, fibrous cellulosic materials such as tissue paper, book papers, crepe paper, wrapping paper, cardboard, chipboard, wallboard and the like; other films such as polyethylene terephthalate, hydroxyethyl cellulose, polyethylene, methyl or ethyl cellulose, polypropylene; wood and wood products such as plywood; textiles such as cotton textiles and fabrics, rayon textiles and fabrics, other vegetable fiber products and the like. For example, the coating compositions may be utilized in coating wooden vats, paper cartons such as milk cartons, wrapping papers for food products, cotton duck for use in awnings, umbrellas and the like. On the other hand, the solvent system of this invention can also be used to cast unsupported films of the vinylidene chloride copolymers disclosed herein.

While preferred embodiments of the invention have been disclosed, the description is intended to be illustrative and it is to be understood that changes and variations may be made without departing from the spirit and scope of the invention as defined by the appended claims.

I claim:
1. A lacquer for casting unsupported films and for coating an unsupported film which comprises a copolymer containing about 85% to about 95% by weight of vinylidene chloride, about 15% to about 5% by weight of acrylonitrile dissolved in a solvent system comprising about 50% to about 80% by weight of tetrahydrofuran and about 50% to about 20% by weight of toluene.

2. A lacquer for casting unsupported films and for coating an unsupported film which comprises a copolymer containing about 85% to about 95% by weight of vinylidene chloride, about 15% to about 5% by weight of acrylonitrile dissolved in a solvent system comprising about 60% to about 70% by weight of tetrahydrofuran and about 40% to about 30% by weight of toluene.

3. A lacquer for casting unsupported films and for coating an unsupported film which comprises a copolymer containing about 90% by weight of vinylidene chloride, about 10% by weight of acrylonitrile dissolved in a solvent system comprising about 50% to about 80% by weight of tetrahydrofuran and about 50% to about 20% by weight of toluene.

4. The lacquer of claim 3 wherein said solvent system comprises about 65% by weight of tetrahydrofuran and about 35% by weight of toluene.

5. A method of preparing a shaped article comprising dissolving a copolymer containing about 85% to about 95% by weight of vinylidene chloride and about 15% to about 5% by weight of acrylonitrile in solvent system comprising about 50% to about 80% by weight of tetrahydrofuran and about 50% to about 20% by weight of toluene, casting said shaped article and removing the solvent therefrom.

References Cited in the file of this patent

UNITED STATES PATENTS

| 2,617,788 | Schaffel et al. | Nov. 11, 1952 |
| 2,658,053 | Signer et al. | Nov. 3, 1953 |
| 2,872,347 | Goland et al. | Feb. 3, 1959 |